(12) United States Patent
Shima

(10) Patent No.: US 6,333,789 B1
(45) Date of Patent: Dec. 25, 2001

(54) PRINTING SYSTEM, METHOD AND APPARATUS FOR PROCESSING A PLURALITY OF TYPES OF INFORMATION DIFFERENT IN PRIORITY

(75) Inventor: Toshihiro Shima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/150,896

(22) Filed: Sep. 10, 1998

(30) Foreign Application Priority Data

Nov. 14, 1997 (JP) ........................................ 9-313282

(51) Int. Cl.⁷ ..................... G06K 15/00; G06F 15/12

(52) U.S. Cl. ................................. 358/1.15; 358/1.12

(58) Field of Search ........................... 358/1.15, 1.12, 358/1.9, 1.14

(56) References Cited

FOREIGN PATENT DOCUMENTS

0917041A2 * 9/1998 (EP) ........................... G06F/3/12

* cited by examiner

Primary Examiner—Jerome Grant, II
(74) Attorney, Agent, or Firm—Sughrue, Mion, Zinn, Macpeak & Seas, PLLC

(57) ABSTRACT

To process a plurality of types of information having different priority according to the priority, multiple logical channels are generated by combining a protocol in a transport layer of a network and a print queue in an application layer and priority is allocated to each logical channel. A host computer sends generated information to a predetermined logical channel by referring to a priority table. A printer discriminates the priority of received information by referring to a priority table and executes the processing of the information according to the priority. As a result, interrupt print data can be processed prior to normal print data or a control command can be processed prior to than print data.

14 Claims, 13 Drawing Sheets

FIG. 2 (A)

| INFORMATION TYPE | PRIORITY | CHANNEL |
|---|---|---|
| INFORMATION 1 | 1 | CH1 |
| INFORMATION 2 | 2 | CH2 |
| INFORMATION 3 | 3 | CH3 |
| INFORMATION 4 | 4 | CH4 |

FIG. 2 (B)

| CHANNEL | PRIORITY |
|---|---|
| CH1 | 1 |
| CH2 | 2 |
| CH3 | 3 |
| CH4 | 4 |

PRINTING SYSTEM, METHOD AND APPARATUS FOR PROCESSING A PLURALITY OF TYPES OF INFORMATION DIFFERENT IN PRIORITY

BACKGROUND OF THE INVENTION

1. Field of the Invention

The present invention relates a printing system, a printing method and a printer wherein a plurality of types of information different in priority, such as print data, can be processed according to the priority.

2. Description of the Related Art

In a conventional type printing system, a host computer such as a personal computer generates print data and sends the print data to a printer connected via a network or a local area network. The printer executes a predetermined printing process on a recording medium by interpreting the received print data and driving a print engine.

Data other than print data can be also sent from a host computer to a printer. For example, a host computer can request the status of the printer such as the residual quantity of paper and toner of a printer. A host computer can also request that the printer stop printing in an emergency.

As one logical channel is allocated to a physical interface between a host computer and a printer according to the above prior art, only one type of information can be sent at a time. That is, until data transmission is completed while first data is transmitted from a host computer to a printer, subsequent data cannot be transmitted because the logical channel is occupied until the transmission of the first data is completed.

Therefore, even if the cancellation of printing is requested after print data is sent to a printer, a cancel printing command cannot be sent to the printer until the transmission of all of the print data is completed. Therefore, the prior art has a problem in that data having a high priority, a command for an urgent stop and data for interrupt printing cannot be promptly processed. Further, the prior art is inefficient because only one logical channel is provided.

SUMMARY OF THE INVENTION

The present invention is designed to solve the above problems by providing a printing system, a printing method and a printer wherein a plurality of types of information different in priority can be processed.

To solve the above problems, in a printing system according to the present invention, a plurality of logical channels which belong to a transport layer or an upper layer are provided and a plurality of types of information different in priority is transferred via each logical channel.

A printing system is provided with an information generating device for generating and transmitting a plurality of types of information different in priority and a printer for receiving the information from the information generating device via a network and processing the information according to the priority. The network includes a plurality of logical channels which belong to at least a transport layer or an upper layer and are different in priority. The information generating device transmits the information to the logical channel according to priority, the printer judges the priority of the information based upon the logical channel and processes the information according to the priority.

"Priority" in the description means the degree of precedence in processing. "A plurality of types of information" includes print data, an urgent stop command, normal print data, interrupt print data and others. "The information generating device" can be realized by a printer driver installed in a host computer for example and others. "A network" means a network connected via a telecommunication line independent of a wire circuit or radio transmission. "A transport layer" means a transport layer of 7 layer-model for open systems interconnection (OSI) which is architecture for intercommunication among systems defined by International organization for Standardization (ISO).

The information generating device generates a plurality of types of information different in priority. Next, the information generating device sends the information to a logical channel according to priority. That is, priority is allocated to each logical channel and information which is high in priority is sent to a printer via a logical channel assigned with high priority. Therefore, a printer can judge the priority of received information by identifying a logical channel used for sending the information and can execute processing according to the priority of the information. Accordingly, urgent information can be promptly processed and facility in handling is also enhanced.

According to another aspect of the present invention, the size of each receive buffer allocated to each logical channel can be set based upon the priority.

The higher the priority of information sent to a printer is, the lower the frequency may be. Conversely, the lower the priority of information is, the lower the frequency may be also. That is, if the priority of information and a frequency in which information is generated are related, an allocated area in a receive buffer can be set dynamically or statistically based upon the priority.

For example, if normal print data which is low in priority and a control command which is high in priority are sent, a large memory area is allocated to the normal print data and the residual memory area can be allocated to the control command. Accordingly, a receive buffer can be efficiently utilized.

According to another aspect of the present invention, the plurality of types of information can include normal print data and interrupt print data.

The priority of interrupt print data has only to be set so that the priority is relatively higher than the priority of normal print data. For example, even if a normal print job is issued from one of the following users in case where a plurality of users share one network printer, an urgent print job can interrupt before the transmission of print data is completed and facility in handling is enhanced.

According to the present invention disclosed in claim 4, the a plurality of types of information can include print data and a control command.

The priority of a control command has only to be set so that the priority is relatively higher than the priority of print data.

As a result, even while print data is transmitted, a control command such as a request for canceling a print job and a request for the urgent stop of printing can be sent to a printer and executed, and waste of printing resources such as paper and toner can be prevented.

According to another aspect of the present invention, the printer is provided with a plurality of output trays and the plurality of types of information can include print data which specify one of the output trays.

If a printer is provided with a plurality of output trays, an output tray on which printed recording media are ejected can be specified for print data. If different priority is allocated to each output tray, print data for which an output tray high in priority is specified is processed in advance. Accordingly, virtual printers can be constructed by the number of output trays on a single printer.

According to the present invention disclosed in claim 6, the a plurality of types of information can include print data the printing language of which is specified and print data the printing language of which is indefinite.

"Print data the printing language of which is indefinite" means print data the printing language of which is not specified and more specifically, means print data the printing language of which is required to be guessed.

If the printing language is specified, a printer interprets print data according to the specified printing language or an emulator and prints it. If a printer receives print data in which the printing language is not specified, the printer guesses the printing language using an intelligent emulation switch (IES) and interprets print data as a known printing language. If the priority of print data in which the printing language is specified is set so that the priority is relatively higher than the priority of print data in which the printing language is no specified, the print data the printing language which is specified can be processed in first. Therefore, time required for switching a task and a switched frequency can be reduced and the printing efficiency can be enhanced.

In another embodiment of the present invention, a printing method is provided for generating and sending a plurality of types of information different in priority and processing the information received via a network according to the priority, the network includes a plurality of logical channels which belong to at least a transport layer or an upper layer, different priority is allocated to each channel, the information is sent to a logical channel according to the priority, the priority of the information is judged based upon the each logical channel and the information is processed according to the priority.

According to another aspect of the present invention, a printer is provided for receiving a plurality of types of information different in priority via a network and processing the information according to the priority. The printer comprises receive buffers which are allocated to a plurality of logical channels which belong to at least a transport layer or an upper layer and are included in the network, discriminating means for discriminating the priority of information received in the receive buffers and processing means for executing requested processing according to the discriminated priority of information.

Information sent to the printer via a logical channel is recorded in a predetermined receive buffer. The discriminating means discriminates the priority of received information based upon the used logical channel. The processing means processes information according to the discriminated priority, in an order in which the priority is higher. Accordingly, information which is high in priority can be promptly processed and facility in handling is enhanced. "The processing means" includes means for processing input information, concretely, means for printing based upon print data, means for operating according to a control command.

According to another aspect of the present invention, the size of the each receive buffer can be set according to the priority.

According to another aspect of the present invention, the plurality of types of information can also include normal print data and interrupt print data.

According to another aspect of the present invention, the plurality of types of information can also include print data and a control command.

According to another aspect of the present invention, a plurality of output trays are provided and the plurality of types of information can also include print data for which an output tray is specified.

According to another aspect of the present invention, the plurality of types of information can include print data in which the printing language is specified and print data in which the printing language of which is not specified.

According to another embodiment of the present invention a program recording medium for recording a computer program for generating information to be sent to a printer is provided. The program comprises a function for discriminating the priority of a plurality of logical channels which belong to at least a transport layer or an upper layer and are included in a network, a function for generating a plurality of types of information for sending to the printer, a function for discriminating the priority of the information, and a function for sending the information to a logical channel according to the discriminated priority.

For the program recording medium, various recording media such as a floppy disk (FD), a compact disc (CD-ROM, CD-R), a hard disk (HD) and a flash memory can be adopted. The program recording medium is not limited to these examples and a communication medium can be also utilized as in the remote down load of a program via a telecommunication line.

The priority of a plurality of logical channels which belong to a transport layer or an upper layer and the priority of a plurality of types of generated information are respectively discriminated by a computer reading a recording medium on which a predetermined program is recorded, and a logical channel used for sending can be selected based upon the priority of the information. Accordingly, information can be sent according to priority and prompt processing is enabled.

BRIEF DESCRIPTION OF THE DRAWINGS

FIG. 2(A) and FIG. 2(B) are explanatory drawings respectively showing the constitution of priority tables;

DESCRIPTION OF THE PREFERRED EMBODIMENTS

Figure 1:
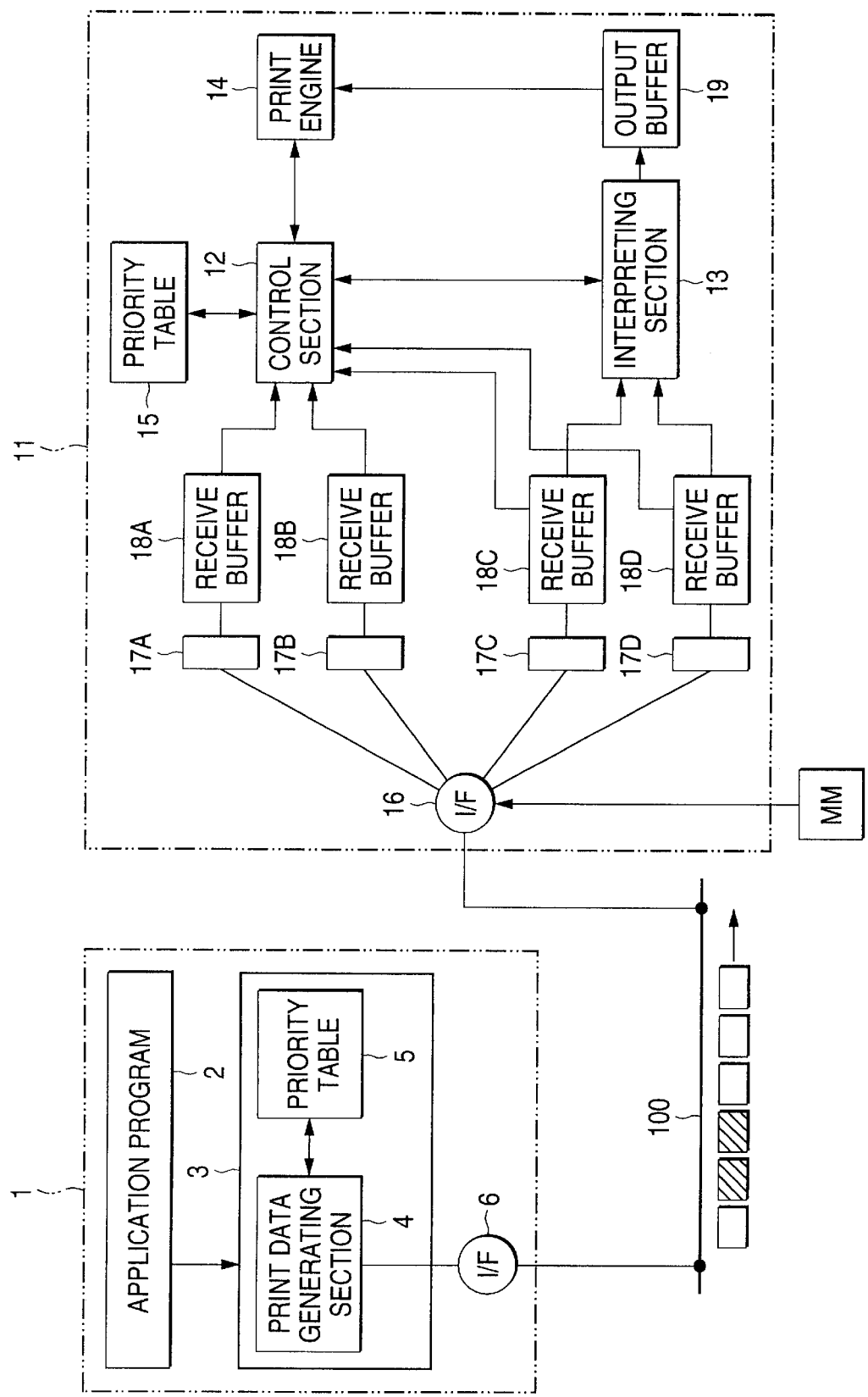
FIG. 1 is a block diagram showing a printing system equivalent to a first embodiment of the present invention.

Referring to FIGS. 1 to 5, a first embodiment of the present invention will be described below. A host computer 1 can be realized as a personal computer, a workstation, a portable information terminal and others and is constituted as a computer system provided with various memories such as a data memory and an image memory and an arithmetic unit. In the host computer 1, an application program 2 and a printer driver 3 are installed.

The printer driver 3 as the information generating device generates and issues print data and a control command as the plurality of types of information. The printer driver 3 is comprises a print data generating section 4 and a priority table 5. The printer driver 3 can suitably utilize computer resources with which the host computer 1 is provided. A source code generated by the application program 2 such as documentation software is converted to print data by the print data generating section 4. The generated print data is sent to a telecommunication line 100 via an interface 6 and input to a printer 11 via the telecommunication line 100. The printer driver 3 can also issue various control commands such as a request for canceling a print job and a request for stopping printing if necessary.

Various methods of generating print data may be adopted. For example, print data may be also generated by converting an input source code to a predetermined printing language by the printer driver 3 and print data may be also generated by converting an input source code to bit image data.

The priority table 5 is provided to manage the priority of various information generated by the printer driver 3 and the priority of a logical channel described later. As shown in FIG. 2(A), the priority table 5 stores the type of information, the priority of information, and the type of a logical channel respectively related one another. For example, the priority table stores an urgent control command such as the stop of printing as information 1 shown in FIG. 2(A), another control command such as a request for status information as information 2, interrupt print data as information 3 and normal print data as information 4.

Therefore, information can be sent via a predetermined logical channel according to priority by referring to the priority table 5. The priority table 5 may be also provided outside the printer driver 3.

The printer 11 is constituted by a control section 12, an interpreting section 13, a print engine 14, a priority table 15 and others.

Information such as print data sent from the host computer 1 is input to an interface 16 via the telecommunication line 100. The information input to the interface 16 is allocated to ports 17A to 17D corresponding to each logical channel. In particular, in the interface 16, the destination port number of input information (packet data) is checked and the information is allocated to each port corresponding to each destination port number with a header removed. Receive buffers 18A to 18D are respectively connected to each port 17A to 17D. The priority becomes lower in the order of a logical channel to which the port 17A corresponds, a logical channel to which the port 17B corresponds, a logical channel to which the port 17C corresponds and a logical channel to which the port 17D corresponds.

In this embodiment, it is assumed that a control command is input to the receive buffers 18A and 18B and print data is input to the receive buffers 18C and 18D. Therefore, the size (i.e., memory capacity) of the receive buffers 18A and 18B to which a control command is respectively input is set so that it is smaller than the size of the receive buffers 18C and 18D to which print data is respectively input. The memory capacity of each receive buffer 18A to 18D can be also dynamically varied according to the status of the use of each logical channel, the frequency of sending via each logical channel and others.

The control section 12 monitors the input of information to each receive buffer 18A to 18D and controls the state of processing based upon the priority of input information. For example, if a command requesting the cancellation of a print job is input to the receive buffer 18A, the control section 12 discriminates priority in processing the cancellation request command by referring to the priority table 15 and cancels the print job by issuing an instruction to the interpreting section 13 and others. The control section 12 can permit the processing of information low in priority, that is, print data until information high in priority is input.

Print data respectively input to the receive buffers 18C and 18D is interpreted by the interpreting section 13 and developed in an output buffer 19. Bit image data developed in the output buffer 19 is transferred to the print engine 14 and printed on a recording medium by the print engine 14. For the print engine 14, an ink-jet type, a thermal transfer type, a laser beam type and others may be adopted.

In the priority table 15 on the side of the printer 11 (i.e., priority managing means), as shown in FIG. 2(B), the priority of each logical channel is stored. The priority table 5 on the side of the host computer 1 may be also called first priority managing means and the priority table 15 on the side of the printer 11 may be also called second priority managing means.

Figure 3:
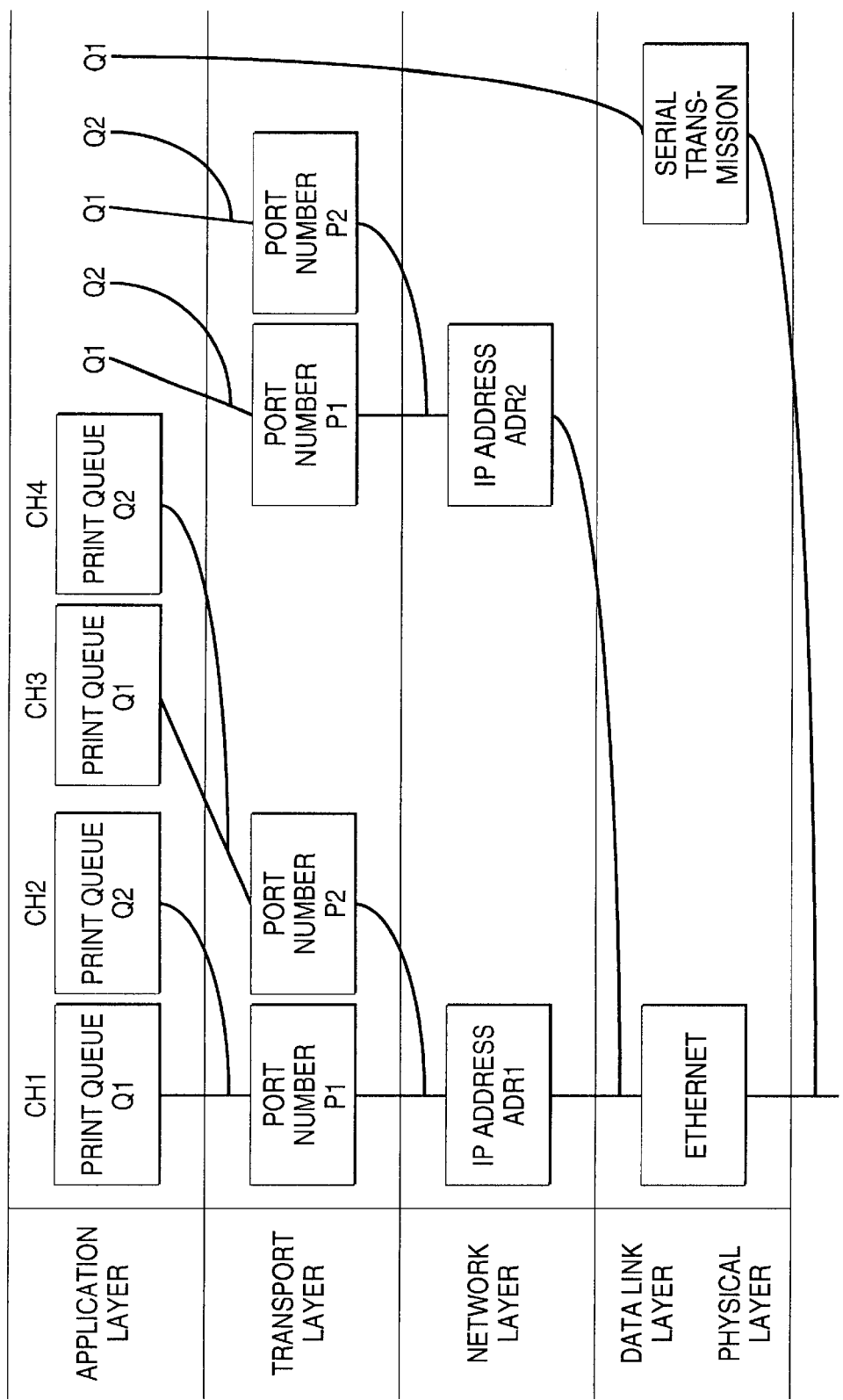
FIG. 3 is an explanatory drawing showing a method of generating a plurality of logical channels in each layer of a network.

Next, referring to FIG. 3, a method of constructing a logical channel will be described. In FIG. 3, a 7 layer-model for OSI is shown. An application layer in FIG. 3 includes a presentation layer and a session layer.

For example, if a plurality of channels are generated in a data link layer/a physical layer, Ethernet is used in one and serial transmission is used in the other. In this case, for example, information input via Ethernet can be processed as print data low in priority and serially transmitted information can be processed as a control command high in priority.

If a plurality of logical channels are generated in a network layer, plural Internet protocol (IP) addresses have only to be set as shown as ADR1 and ADR2. In this case, for example, one IP address ADR1 can be used for receiving print data and the other IP address ADR2 can be used for receiving a control command or a plurality logical channels can be generated using two types of protocols including an Internet protocol (IP) and an internetwork packet exchange (IPX) protocol. In this case, for example, IP can be used for receiving print data and IPX protocol can be used for receiving a control command.

Further, if multiple logical channels are generated in a transport layer, a suitable one of protocols such as a simple network management protocol (SNMP), a file transfer protocol (FTP), a telecommunication network (Telnet) and a line printer protocol (Lpr) has only to be used. As a port number is specified for each protocol beforehand, information for which a port number 161 for example is specified is processed as information according to SNMP and information for which a port number 21 is specified is processed as information according to FTP. A port number 23 corresponds to Telnet and a port number 515 corresponds to Lpr.

If multiple logical channels are generated in the application layer, a suitable one of multiple print queues shown as Q1 and Q2 has only to be used. In this case, one print queue Q1 can be used for receiving print data and the other print queue Q2 can be used for receiving a control command.

As described above, multiple logical channels can be generated by using suitable protocols and suitable print queues in the network layer. Since hardware is required if multiple channels are generated in the data link layer/the physical layer, the cost is increased and the structure is also complicated. As multiple IP addresses are required to be preset for one printer 11 if multiple channels are generated in the network layer by using multiple IP addresses, setup operation is complicated and facility in handling is reduced. Therefore, in this embodiment, multiple logical channels shall be generated in the transport layer or an upper layer.

Figure 4:
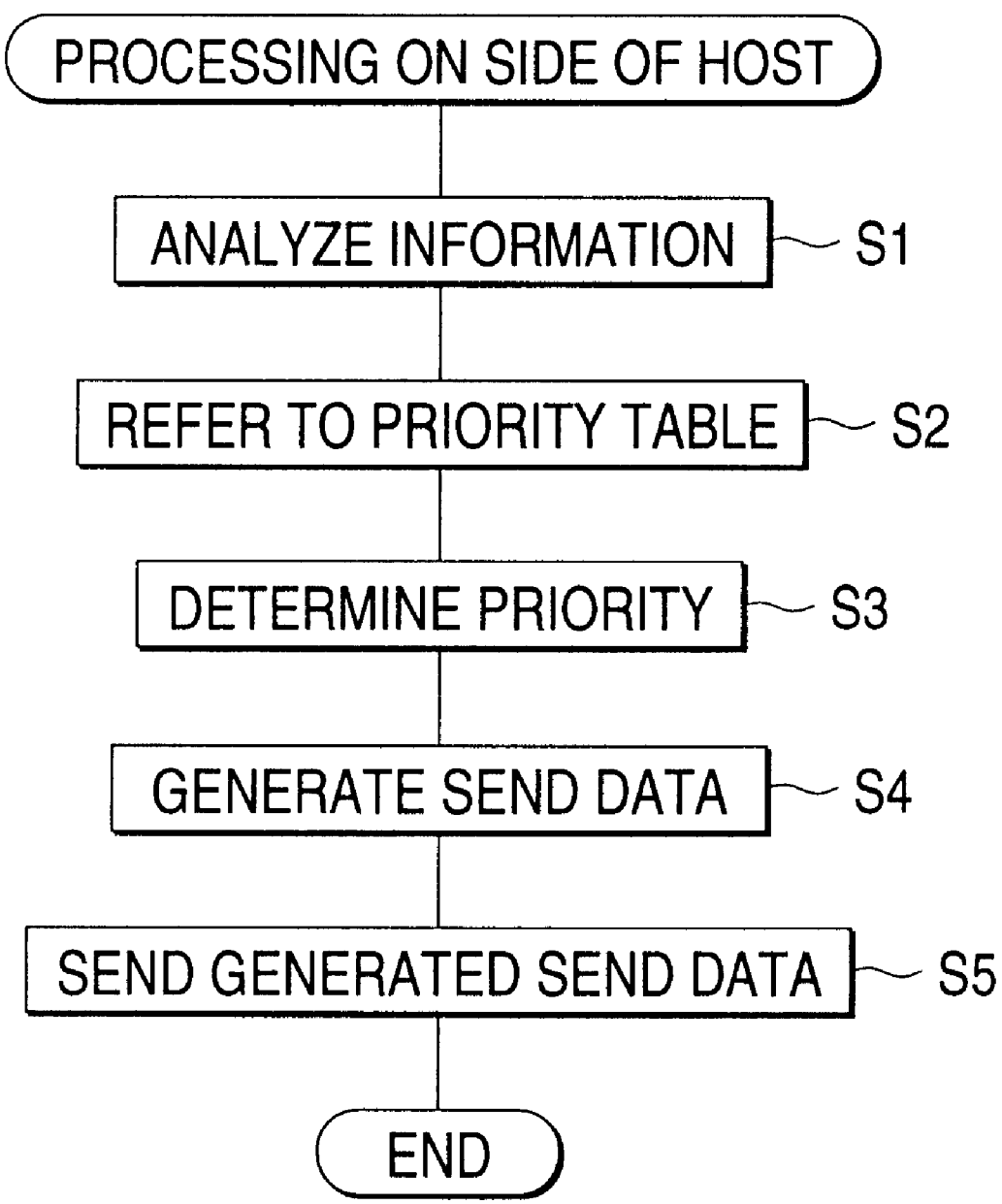
FIG. 4 is a flowchart showing processing for generating information such as print data on the side of a host computer.

Next, referring to FIGS. 4 and 5, action in this embodiment will be described. First, FIG. 4 is a flowchart showing processing on the side of the host computer 1.

In a step (hereinafter called S as its abbreviation) 1, information input from the application-program 2 for example and others is analyzed. That is, the type of information such as print data and a control command is checked. Next, the priority table 5 is referred based upon the type of the checked information in S2 and the priority of the input information is determined in S3. A logical channel used for sending is also determined based upon the determined priority.

Send data is generated in S4 by executing processing such as adding a required header to information. The send data is sent to the printer 11 via a predetermined logical channel in S5.

Figure 5:
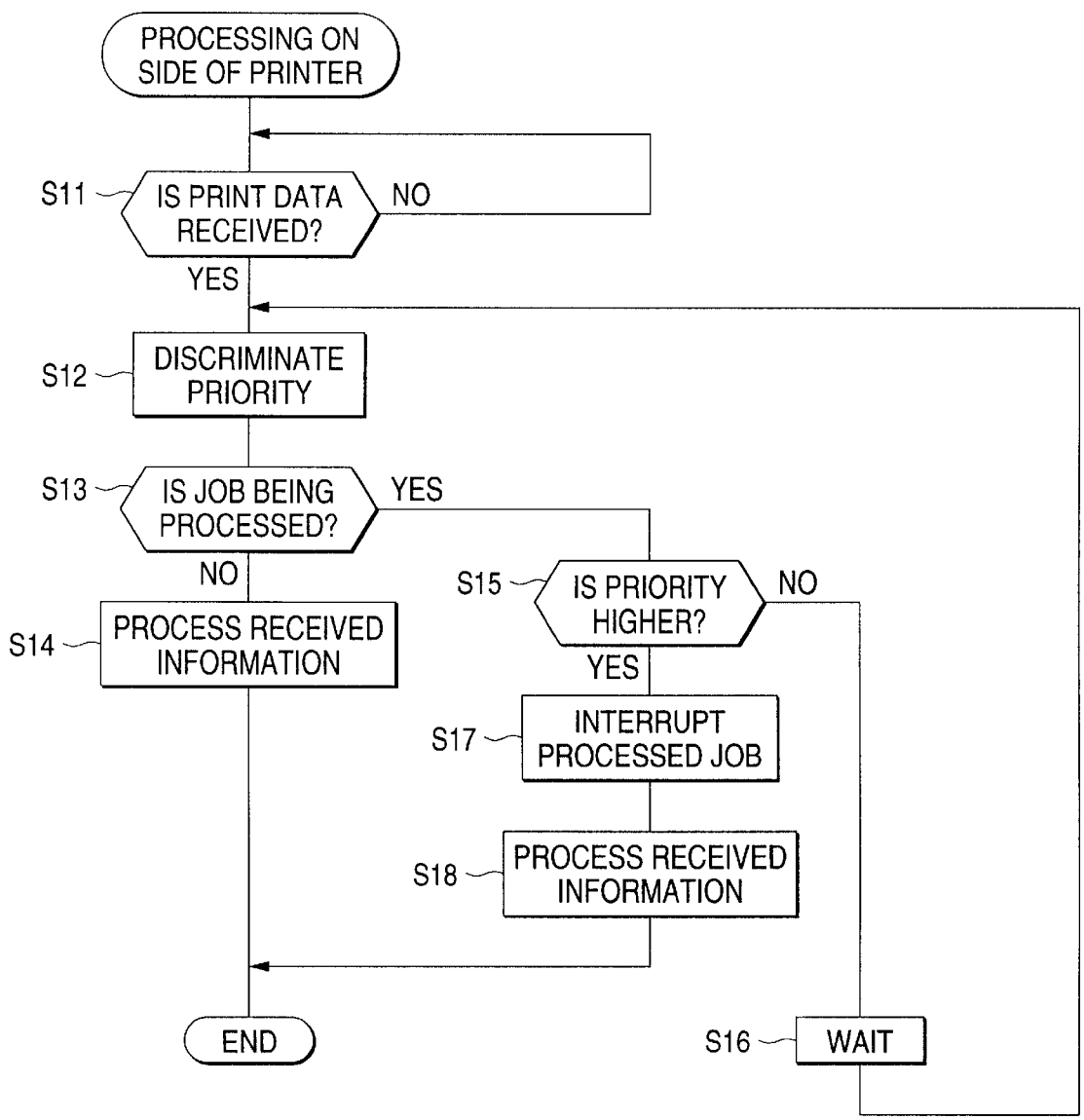
FIG. 5 is a flowchart showing processing for received information on the side of a printer.

Next, FIG. 5 is a flowchart showing processing on the side of the printer 11. First, in S11, it is monitored whether information such as print data and a control command is input from the host computer 1 or not. When information is input from the host computer 1, the information is stored in a predetermined receive buffer. The priority of the received information is discriminated in S12 by checking information is stored in which receive buffer and referring to the priority table 15.

Next, it is judged in S13 whether a currently processed job exists or not. If no precedent job exists, "NO" is selected in S13 and the processing of received information is executed in S14. That is, for example, if received information is print data, the print data is interpreted and printing is executed. If received information is a control command, various operation is executed according to the contents of the control command.

In the meantime, if another print job is processed, "YES" is selected in S13 and next, the priority of a currently processed job and the priority of the latest information received in S11 are compared in S15. If the priority of the precedent job is higher than the priority of received information, the received information is on standby in S16.

Conversely, if the priority of received information is higher than the priority of the precedent job, the processing of the precedent job is interrupted in S17 and the processing of the received information is executed in advance in S18.

Various methods can be adopted to interrupt the precedent job in S17. For example, it may be also determined according to time until the precedent job is completed whether the processing of information high in priority should be permitted or not. For example, in case the precedent job is completed if some sheets are printed, information high in priority may be also processed after the precedent job is completed. Reference time for discriminating whether the completion of the precedent job is awaited or not may be also set variably according to difference in priority.

According to this embodiment as described above, the following effect can be produced. First, as multiple logical channels are generated between the host computer 1 and the printer 11 and processing is executed according to the priority of information, urgent information such as a printing urgent stop command can be promptly processed. As information high in priority is promptly processed, printing resources can be prevented from being consumed uselessly and facility in handling is enhanced.

Second, as multiple logical channels are generated in the transport layer or an upper layer, multiple logical channels can be readily and simply obtained. That is, as the addition of hardware resources such as a telecommunication line and the setting of multiple IP addresses are not required, multiple logical channels can be simply generated. If multiple logical channels are generated in the application layer by increasing the types of print queues and others, information to be sent from the host computer 1 to the printer 11 is made longer and efficiency in transmitting information and the efficiency of processing are deteriorated by the quantity. Therefore, it is desirable as in this embodiment that multiple logical channels are generated by combining a protocol in the transport layer and a print queue in the application layer.

Third, as the size of the receive buffers 18A to 18D is set according to the priority of each logical channel, memory resources can be efficiently utilized.

Fourth, as priority is preset every logical channel, efficiency in transmitting information can be enhanced, compared with a case that priority is written in the header of information.

Next, referring to FIGS. 6 and 7, a second embodiment of the present invention will be described. In the following embodiments, the same reference number is allocated to the same component as a component in the first embodiment and the description is omitted.

This embodiment is characterized in that normal print data and interrupt print data are used.

Figure 6:
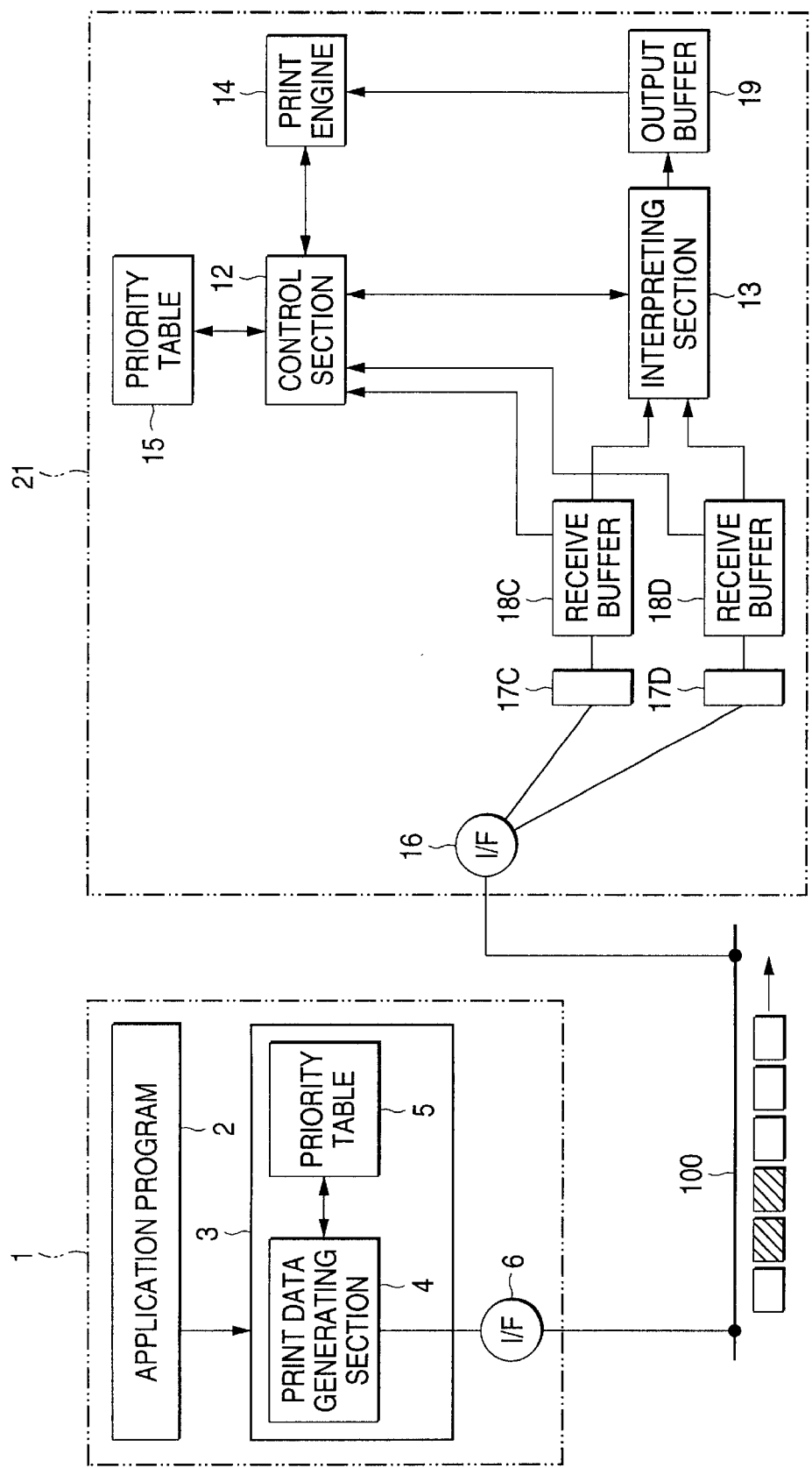
FIG. 6 is a block diagram showing a printing system equivalent to a second embodiment of the present invention.
Figure 7:
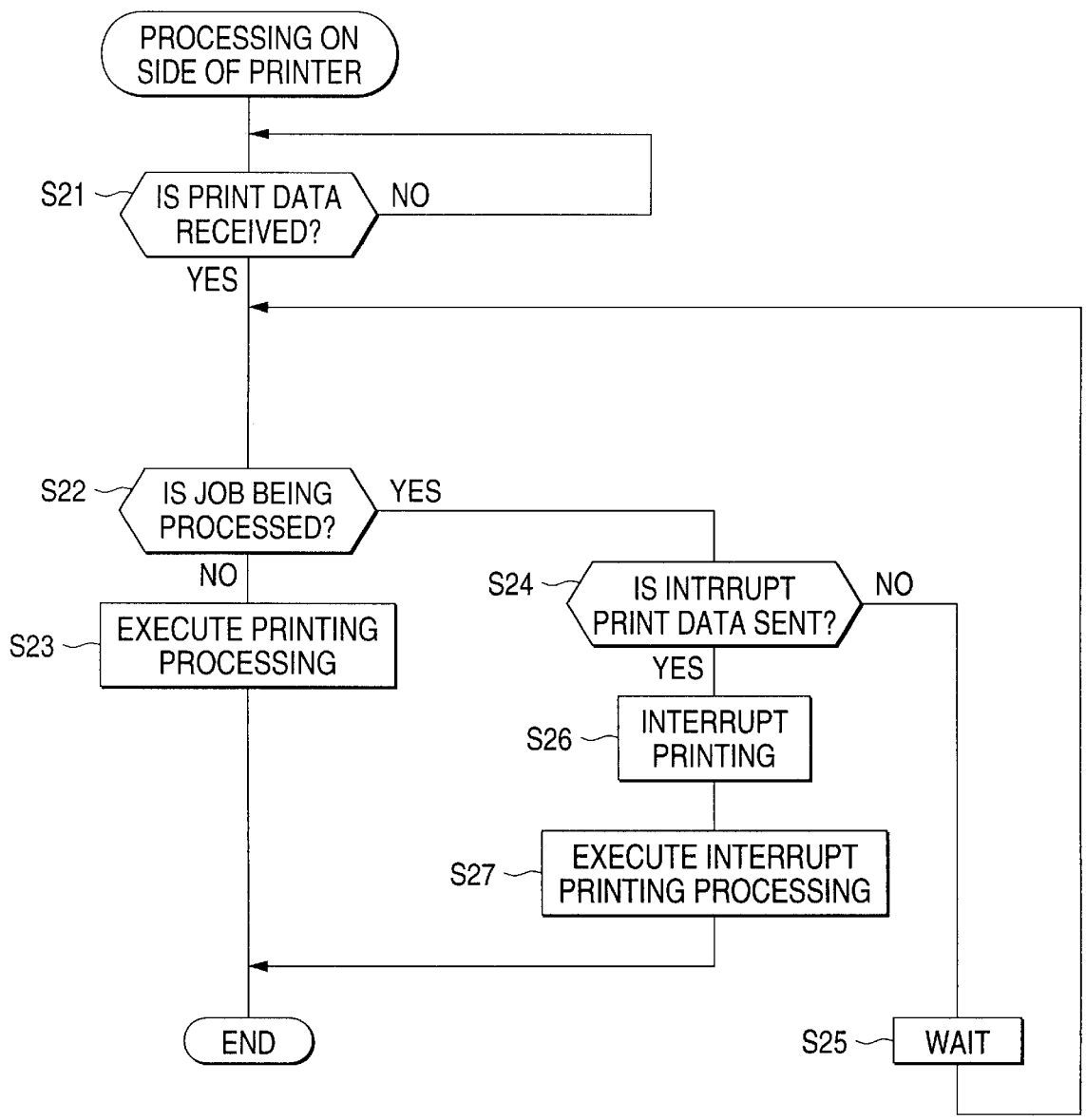
FIG. 7 is a flowchart showing processing for received information on the side of a printer.

As shown in FIG. 6, a printing system equivalent to this embodiment is also provided with a host computer 1 for generating print data and others and a printer 21 for executing printing processing and others. However, as in this embodiment, normal print data and interrupt print data are used for multiple types of information different in priority, a logical channel for sending normal print data and a logical channel for sending interrupt print data are generated, and a receive buffer 18C for storing print data and a receive buffer 18D for storing interrupt print data are provided to the printer 21. In this embodiment, the priority of interrupt printing is set so that it is higher than the priority of normal printing.

Next, referring to a flowchart shown in FIG. 7, action in this embodiment will be described.

The printer 21 monitors whether print data from the host computer 1 is received or not in S21 and if print data is received, it is judged in S22 whether another print job is processed or not. If no precedent print job exists, the print data received in S21 is interpreted and printing processing is executed in S23.

However, if the precedent print job exists, it is judged whether the latest print data received in S21 is interrupt print data or not. In other words, the priority of the precedent print job and the priority of the received latest print data are compared.

If the precedent print job is interrupt printing and print data received later is normal print data and if the precedent print job and print data received later are both normal print data or interrupt print data, "NO" is selected in S24 and the print data received later is on standby in S25.

In the meantime, if the precedent print job is normal print data and print data received later is interrupt print data, the precedent print job is interrupted in S26 and print data related to interrupt printing is processed in advance in S27.

In this embodiment constituted as described, the similar effect to that in the first embodiment can be also obtained. Particularly, as in this embodiment, two types of logical channels including a logical channel for sending normal print data and a logical channel for sending interrupt print data are generated, the priority of interrupt print data is set so that it is higher and the interrupt print data is processed in advance, an urgent document can be promptly printed and facility in handling is enhanced.

Figure 8:
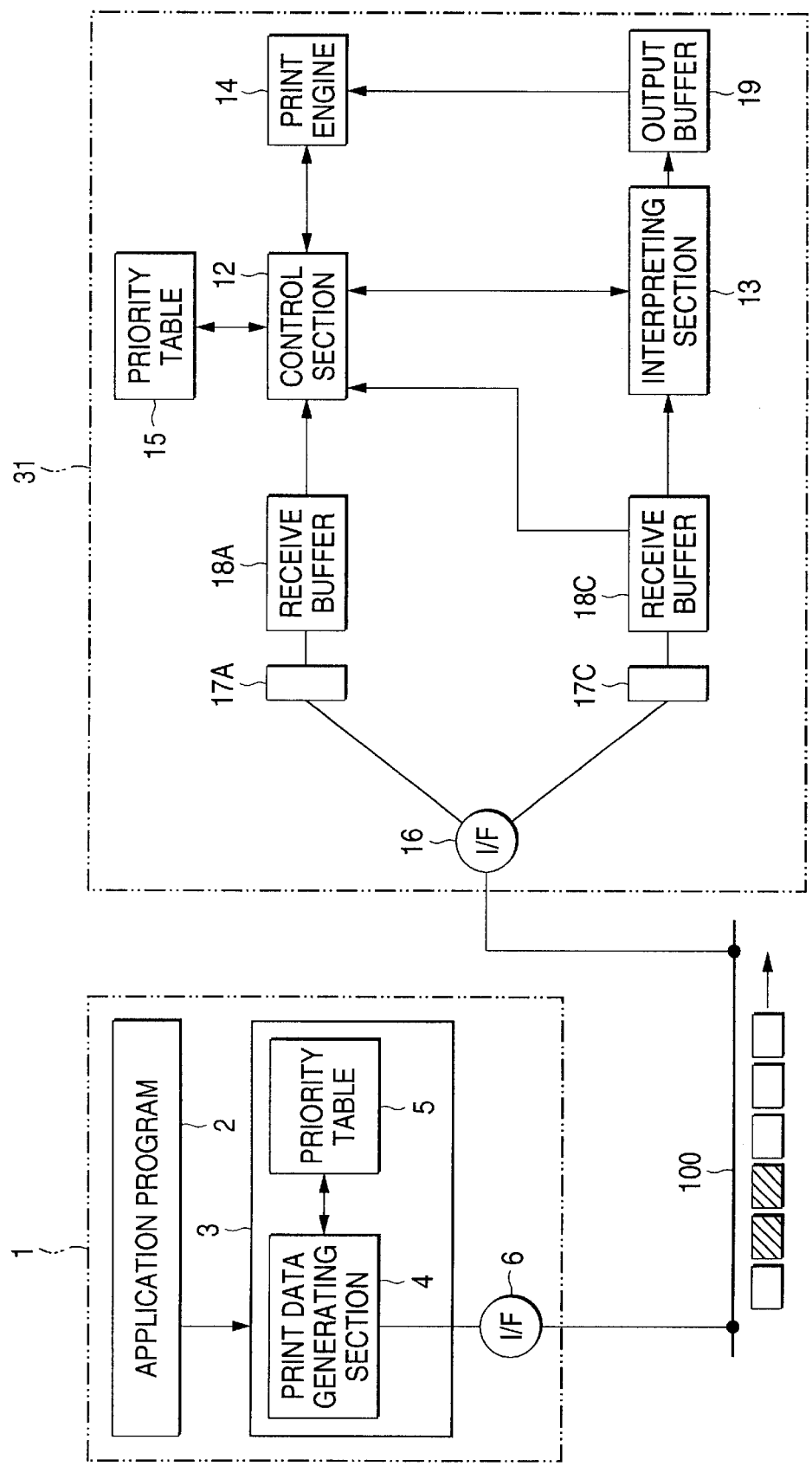
FIG. 8 is a block diagram showing a printing system equivalent to a third embodiment of the present invention.
Figure 9:
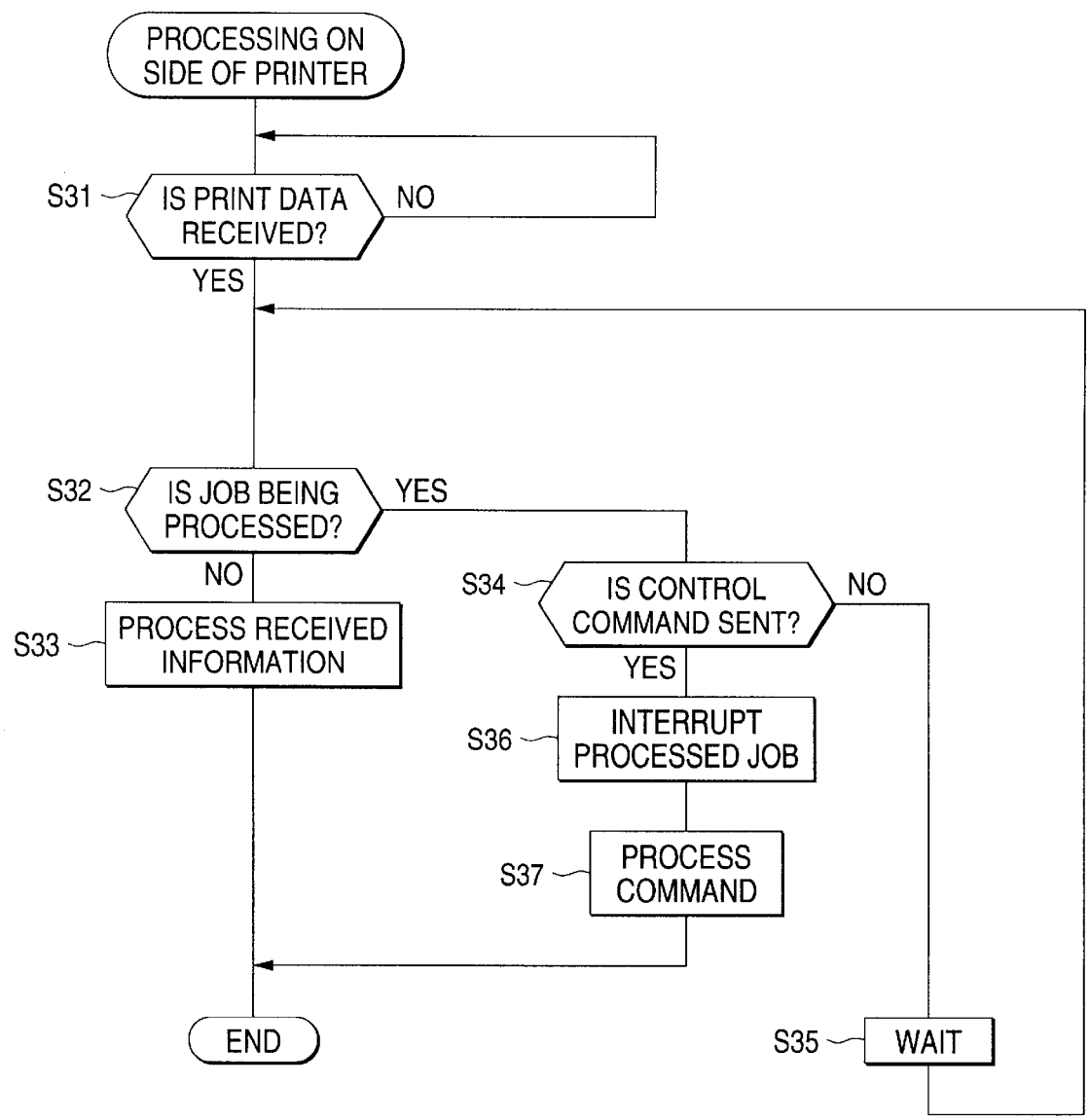
FIG. 9 is a flowchart showing processing for received information on the side of a printer.

Next, referring to FIGS. 8 and 9, a third embodiment of the present invention will be described. This embodiment is characterized in that print data and a printing command are used.

A printer 31 comprises a control section 12, an interpreting section 13, a print engine 14, a priority table 15 and others. However, as in this embodiment, print data and a control command are used as information different in priority, a logical channel for sending print data and a logical channel for sending a control command are generated, and a receive buffer 18A for receiving a control command and a receive buffer 18C for receiving print data are provided to the printer 31. The priority of a control command is set so that it is higher than the priority of print data. As the quantity of data included in a control command is small, the receive buffer 18A is set so that it is smaller than the receive buffer 18C.

Next, referring to a flowchart shown in FIG. 9, the action of this embodiment will be described. First, it is monitored in S31 whether print data or a control command is received from a host computer 1 or not and if some information is received from the host computer 1, it is judged in S32 whether the precedent another job is processed or not. If no precedent another job exists, information received in S31 is processed in S33. That is, if the received information is print data, the print data is interpreted, printing is executed and if the received information is a control command, processing according to the contents requested in the control command is executed.

However, if the precedent job is being processed, "NO" is selected in S32 and it is judged in S34 whether information received next is a control command or not. That is, the priority of the precedent job being processed and the priority of received information are compared.

If the precedent job is a control command and the succeeding information is print data and if both the precedent job and the succeeding information are print data, that is, if the priority of the succeeding information is not higher than the priority of the precedent job, the processing of the succeeding information is on standby in S35.

In the meantime, as the priority of a control command is higher if the precedent job is print data and the succeeding information is the control command, the precedent print job is interrupted in S36 and processing requested by the control command is executed in advance in S37.

In this embodiment constituted as described, the similar effect to that in the first embodiment can be obtained. Particularly, as in this embodiment, a logical channel for sending print data and a logical channel for sending a control command are generated, the priority of a control command is set so that it is higher than the priority of print data and a control command is processed in advance, a command requesting the cancellation of a print job, a printing urgent stop command and others can be promptly processed. Therefore, useless printing can be prevented from being caused and facility in handling is also enhanced.

The priority of a control command is not required to be set so that the priority is uniformly higher than the priority of print data and the priority may be set according to the character of each control command. For example, in the case of a control command for inquiring only the status of a printer, the priority of the control command may be also set so that it is lower than the priority of print data.

Figure 10:
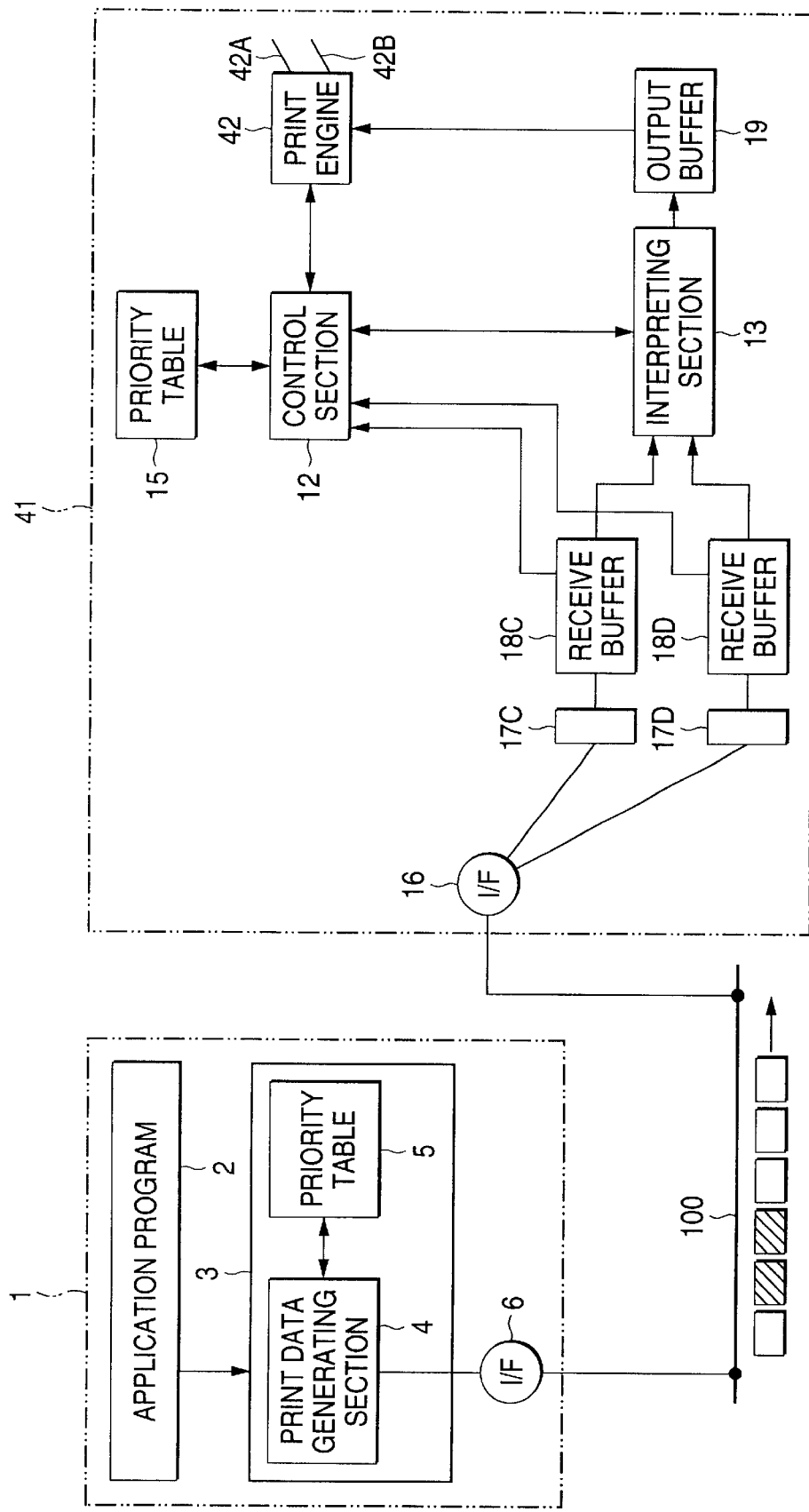
FIG. 10 is a block diagram showing a printing system equivalent to a fourth embodiment of the present invention.
Figure 11:
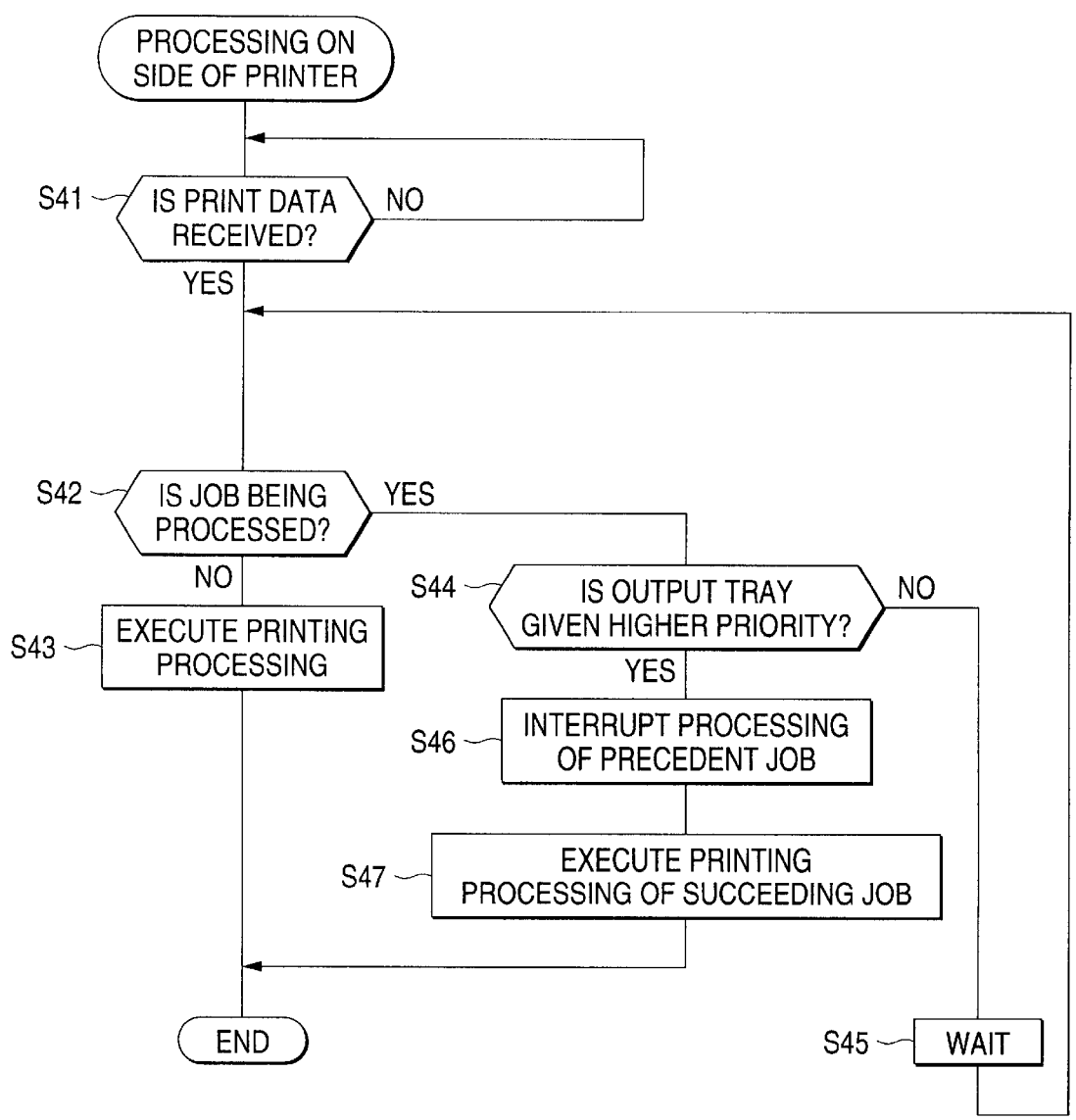
FIG. 11 is a flowchart showing processing for received information at a printer.

Next, referring to FIGS. 10 and 11, a fourth embodiment of the present invention will be described. This embodiment is characterized in that priority in processing differs depending upon the specified number of an output tray.

A printer 41 is provided with a control section 12, an interpreting section 13, a priority table 15 and others as described in the embodiments. In addition, two output trays 42A and 42B are provided to a print engine 42 in this embodiment.

That is, in this embodiment, either of the output trays 42A and 42b can be specified as a destination at which printed recording paper is ejected, and a logical channel for sending print data for which the output tray 42A is specified and a logical channel for sending print data for which the output tray 42B is specified are generated.

The print data for which the output tray 42A is specified is stored in a receive buffer 18C and the print data for which the output tray 42B is specified is stored in a receive buffer 18D. The priority of the print data for which the output tray 42B is specified is set so that the priority is higher than the priority of the print data for which the output tray 42A is specified.

Next, referring to a flowchart shown in FIG. 11, the action of this embodiment will be described. First, in S41, it is monitored whether print data from a host computer 1 is received or not and if print data is received, it is judged in S42 whether the precedent another print job is processed or not. If no precedent print job exists, the print data received in S41 is interpreted, printed and ejected on a specified output tray S43.

In the meantime, if the precedent print job is processed, the priority of processing is judged in S44 by comparing the numbers of the specified output trays. If the output tray 42B high in priority is specified for the precedent print job and the output tray 42A low in priority is specified for the succeeding print data received in S41, the succeeding print data is on standby in S45.

Conversely, if the output tray 42A low in priority is specified for the precedent print job and the output tray high in priority is specified for the succeeding print data, the processing of the precedent print job is interrupted in S46 and the succeeding print data is interpreted and ejected on the specified output tray in S47.

In the embodiment described above, a similar effect to that in the first embodiment can be obtained. In addition, in this embodiment, as a logical channel is generated every specified number of the output tray and the priority of print data for which one output tray is specified is set so that it is higher than the priority of print data for which the other output tray is specified, physically one printer 41 can be utilized as multiple virtual printers. The printers can be used appropriately as for example, in case the output tray 42A low in priority is shared by the members of a group and the output tray 42B high in priority is used by a manager of the group and facility in handling is enhanced.

5. Fifth Embodiment

Figure 12:
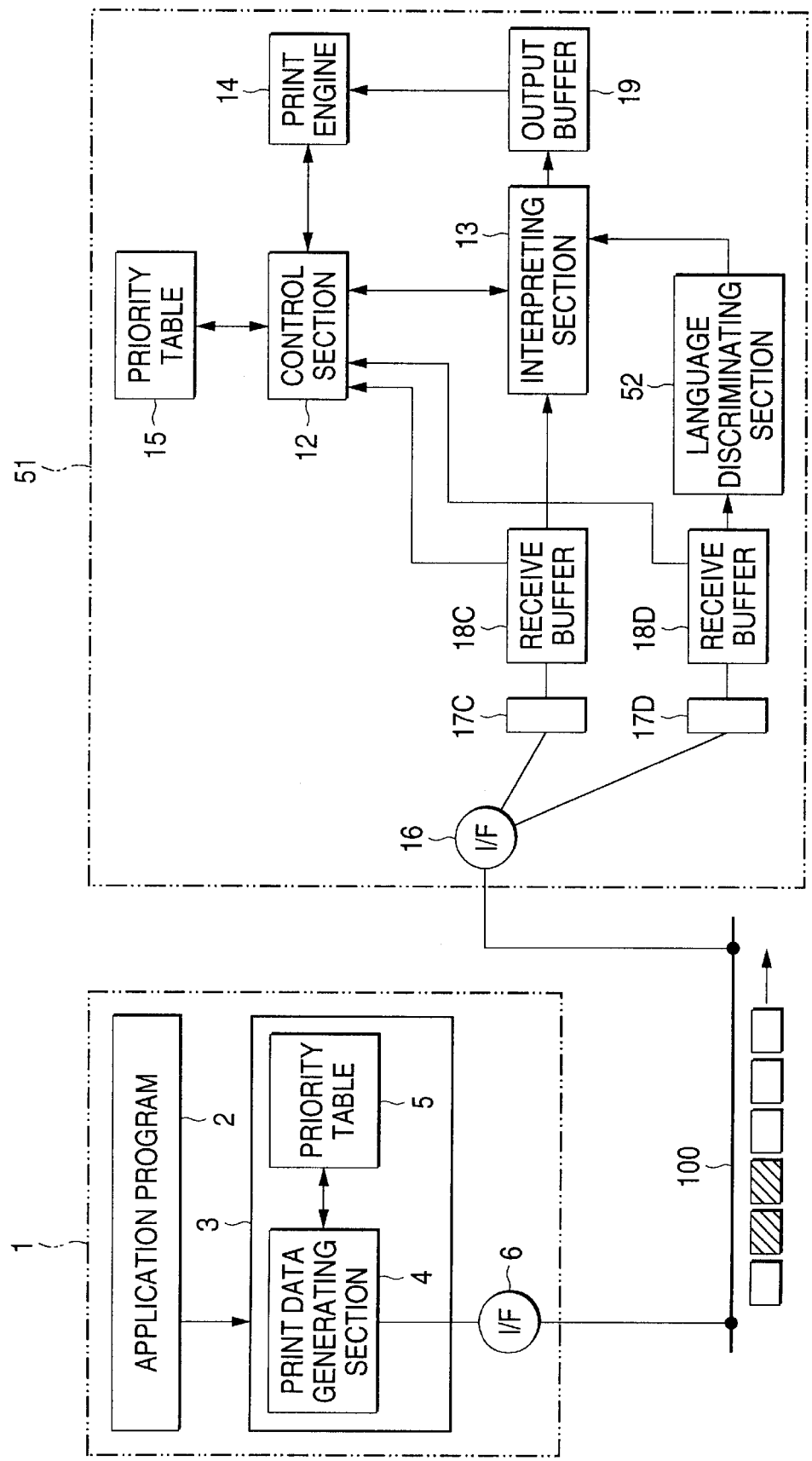
FIG. 12 is a block diagram showing a printing system of a fifth embodiment of the present invention.
Figure 13:
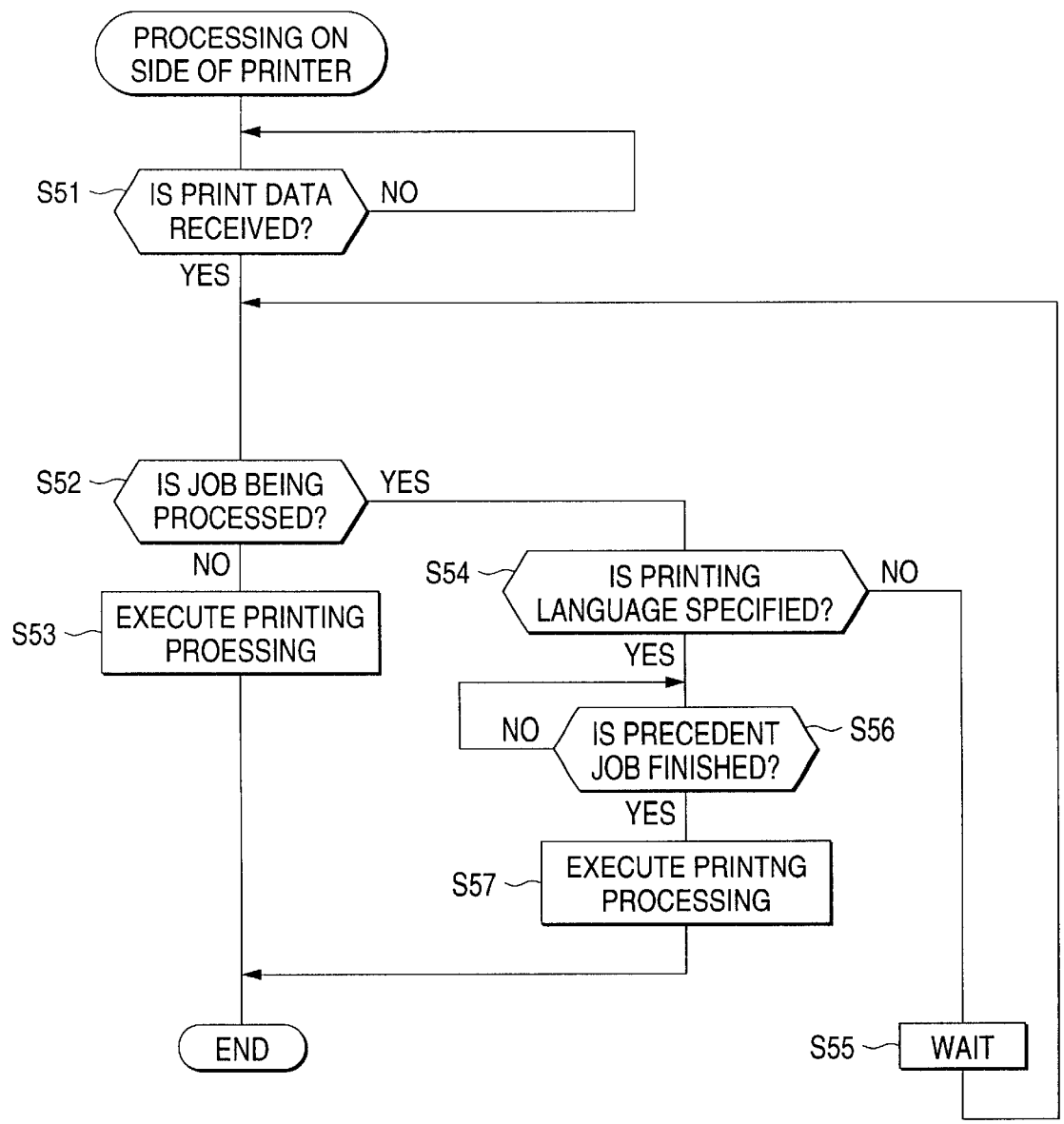
FIG. 13 is a flowchart showing processing for received information at a printer.

Next, referring to FIGS. 12 and 13, a fifth embodiment of the present invention will be described. This embodiment is characterized in that priority in processing differs depending upon whether printing language is specified or not.

A printer 51 is also provided with a control section 12, an interpreting section 13, a print engine 14, a priority table 15 and others as in the embodiments. In addition, a language discriminating section 52 which can be called printing language discriminating means is provided to the printer 51. The language discriminating section 52 is known as an intelligent emulation switch (IES), interprets print data in various printing languages supported in an emulation mode and discriminates printing language in which the most appropriate result of interpretation is obtained as the printing language of the corresponding print data.

In this embodiment, a logical channel for sending print data the printing language of which is specified beforehand and a logical channel for sending print data the printing language of which is not specified are generated. The print data the printing language of which is specified is stored in a receive buffer 18C and interpreted by the interpreting section 13. In the meantime, the print data the printing language of which is not specified is stored in another receive buffer 18D and after the printing language is discriminated by the language discriminating section 52, it is interpreted by the interpreting section 13. The priority of print data the printing language of which is specified is set so that the priority is higher than the priority of print data the printing language of which is not specified.

Next, referring to a flowchart shown in FIG. 13, the action of this embodiment will be described. First, in S51, it is monitored whether print data from a host computer 1 is received or not and if print data is received, it is judged in S52 whether the precedent another print job is processed or not. If no precedent print job exists, the print data received in S51 is interpreted and printing processing is executed in S53.

However, if the precedent print job exists, priority in processing is discriminated in S54 by checking whether the printing language of the print data received in S51 is specified or not. If the printing language of the succeeding print data is not specified, the processing of the print data is on standby in S55.

Conversely, if the printing language of the succeeding print data is specified, it is awaited in S56 that the precedent print job is finished and after the precedent print job is finished, printing processing is executed in S57. Therefore, print data the printing language of which is specified is processed earlier than print data the printing language of which is not specified.

In this embodiment constituted as described, the similar effect to that in the first embodiment can be also obtained. Particularly, as in this embodiment, print data the printing language of which is specified can be processed in advance, speed for printing processing can be enhanced and facility in handling is enhanced. That is, if printing language is not specified, it takes time for the language discriminating section 52 to guess printing language and time required for switching languages is also increased. Therefore, when print data the printing language of which is specified and print data the printing language of which is not specified are dealt without discrimination, the efficiency of printing processing is deteriorated and the consumed quantity of a memory is also increased. Further, in this embodiment, as print data the printing language of which is specified is processed in advance, the efficiency of printing can be enhanced and a printing schedule can be also readily estimated.

In judging in S54 whether printing language is specified or not, the order of printing may be also changed based upon time required for switching languages for example and others. That is, if multiple print data competes, print data short in switching time can be processed in advance.

Various additions and variations are allowed within the scope of the present invention described in the embodiments. For example, the present invention can be also realized by storing a predetermined program on a recording medium MM and loading the program into the printer 11 as shown in FIG. 1. The recording medium includes a communication medium enabling download via a telecommunication network in addition to various tangible recording media such as ROM, FD, CD-ROM and a memory card. FIG. 1 shows a case that a program stored on the recording medium MM is read on the side of the printer 11, however, the program on the recording medium may be also read on the side of the host computer 1.

A system for synthetically processing each information described in the embodiments, that is, each information such as normal print data, interrupt print data, print data and a control command may be also constituted. Such a printing system can be realized in the first embodiment.

Further, the host computer 1 is not required to be realized by a personal computer and others and for example, print data and others may be also directly input to the printer 11 from another information generating device such as a digital camera.

As described above, according to the printing system, the printing method and the printer respectively according to the present invention, multiple types of information different in priority can be sent via each logical channel and can be processed according to the priority. Therefore, urgent information can be promptly processed and facility in handling is enhanced.

What is claimed is:

1. A printing system comprising:

an information generator for generating and sending a plurality of types of information which are different in priority; and a printer for receiving the information from the information generator via a network and processing the information according to the priority, wherein the network includes a plurality of logical channels which are different in priority and belong to at least a transport layer or an upper layer, the information generator sends the information to the logical channels according to the priority of the information, and the printer determines the priority of the information based upon the priority of the logical channel through which the information was received and processes the information according to the priority.

2. A printing system according to claim 1, wherein:

said printer comprises a plurality of receive buffers which are each allocated for a corresponding logical channel and have a size which is set according to the priority of the corresponding logical channel.

3. A printing system according to claim 1 or 2, wherein:

said plurality of types of information include normal print data and interrupt print data.

4. A printing system according to claim 1 or 2, wherein:

said plurality of types of information include print data and a control command.

5. A printing system according to claim 1 or 2, wherein:

said printer comprises a plurality of output trays; and said plurality of types of information include print data for which a particular output tray is specified.

6. A printing system according to claim 1 or 2, wherein:

said plurality of types of information include print data in which the printing language is designated and print data in which the printing language is specified.

7. A printing method for generating and sending a plurality of types of information different in priority and processing the information received via a network according to the priority, wherein the network includes a plurality of logical channels which belong to at least a transport layer or an upper layer and a different priority is allocated to each channel, the printing method comprising the steps of:

transmitting information via the logical channels according to the priority;

receiving the transmitted information and determining the priority of the information based upon the logical channel through which the information was received; and processing the information is processed according to the determined priority.

8. A printer for receiving a plurality of types of information different in priority via a network and processing the information according to the priority, comprising:

a plurality of receive buffers which belongs to at least a transport layer or an upper layer and which are respectively allocated to a plurality of logical channels included in the network;

discriminating means for discriminating the priority of information received in the receive buffers; and processing means for executing requested processing according to the discriminated priority of the information.

9. A printer according to claim 8, wherein:

a size of each of the receive buffers is set based upon the priority of the logical channel to which each receive buffer is allocated.

10. A printer according to claim 8 or 9, wherein:

the plurality of types of information include normal print data and interrupt print data.

11. A printer according to claim 8 or 9, wherein:

the plurality of types of information include print data and a control command.

12. A printer according to claim 8 or 9, further comprising:

a plurality of output trays, wherein the plurality of types of information include print data for which a particular output tray is specified.

13. A printer according to claim 8 or 9, wherein:

the plurality of types of information include print data in which the printing language is specified and print data in which the printing language is not specified.

14. A program recording medium for storing a predetermined computer program for generating information to be sent to a printer, the program comprising:

a function for discriminating the priority of a plurality of logical channels of a network which belong to at least a transport layer or an upper layer;

a function for generating a plurality of types of information for transmission to a printer;

a function for discriminating the priority of the information; and a function for transmitting the information to a particular logical channel according to the discriminated priority.

* * * * *